(12) United States Patent
Noth et al.

(10) Patent No.: US 8,620,914 B1
(45) Date of Patent: Dec. 31, 2013

(54) RANKING OF DIGITAL GOODS IN A MARKETPLACE

(75) Inventors: Michael Noth, Bothell, WA (US); Chee Heng Chew, Redmond, WA (US); Rahul Roy-Chowdhury, Redwood City, CA (US); Erik Kay, Belmont, CA (US); Qian Huang, Sammamish, WA (US); Qinming Fang, Bellevue, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/110,907

(22) Filed: May 18, 2011

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
*G06F 7/00* (2006.01)
*G06F 17/30* (2006.01)
(52) U.S. Cl.
USPC ............................ 707/732; 707/748; 707/751

(58) Field of Classification Search
USPC ............. 703/22; 702/182, 185–186; 707/736, 707/748, 751, 732
See application file for complete search history.

(56) References Cited

U.S. PATENT DOCUMENTS

| | | | |
|---|---|---|---|
| 2002/0174421 A1* | 11/2002 | Zhao et al. .................... | 717/174 |
| 2003/0160831 A1* | 8/2003 | Ball et al. ...................... | 345/835 |
| 2007/0088741 A1* | 4/2007 | Brooks et al. ............. | 707/103 R |
| 2009/0182533 A1* | 7/2009 | Neuenschwander et al. . | 702/185 |

* cited by examiner

*Primary Examiner* — Vincent F Boccio
(74) *Attorney, Agent, or Firm* — Brake Hughes Bellermann LLP (57) ABSTRACT

According to one general aspect, a method of presenting to a user a subset of applications that may be executed by a computing device is described. The subset of applications may be selected from a plurality of applications available an online marketplace for such applications. The method may include ranking the applications based on signals relevant to the relative desirability to the user of different applications, wherein at least one of the signals is based on information that is generated outside of the marketplace. The method may further include selecting the subset of applications based on their respective rankings. The method may also include presenting the selected subset to the user.

19 Claims, 5 Drawing Sheets

RANKING OF DIGITAL GOODS IN A MARKETPLACE

CROSS REFERENCE TO RELATED APPLICATIONS

This application claims the benefit, under 35 U.S.C. §119, of U.S. Provisional Patent Application No. 61/345,999, "Installable Web Applications", U.S. Provisional Patent Application No. 61/346,000, "Web Store For Digital Goods", and U.S. Provisional Patent Application No. 61/346,013, "Chrome Extensions", all filed May 18, 2010. The disclosures of these provisional patent applications are incorporated herein by reference in their entirety.

TECHNICAL FIELD

This disclosure relates to the ranking in display of digital goods in a marketplace.

BACKGROUND

When digital goods, such as installable applications, are offered in an online marketplace, and the overwhelming number of applications might compete for the users attention, but only a few can be displayed to the user at one time on a user interface of the marketplace that is shown to the user. Thus, there is a need to select the apps that are best suited for the user.

SUMMARY

According to one general aspect, a method includes presenting to a user a subset of applications that may be executed by a computing device is described. The subset of applications may be selected from a plurality of applications available an online marketplace for such applications. The method may include ranking the applications based on signals relevant to the relative desirability to the user of different applications, wherein at least one of the signals is based on information that is generated outside of the marketplace. The method may further include selecting the subset of applications based on their respective rankings. The method may also include presenting the selected subset to the user.

According to another general aspect, an apparatus that includes a processor and a memory. The processor may be configured to execute machine executable code that, when executed, cause the apparatus to present to a user a subset of applications that may be executed by a computing device. The subset of applications may be selected from a plurality of applications available an online marketplace for such applications. The code may cause the apparatus to rank the applications based on signals relevant to the relative desirability to the user of different applications, wherein at least one of the signals is based on information that is generated outside of the marketplace. The code may cause the apparatus to select the subset of applications based on their respective rankings. The code may cause the apparatus to present the selected subset to the user.

According to another general aspect, a computer-readable medium may be tangibly embodied and include executable code that causes an apparatus to present to a user a subset of applications that may be executed by a computing device. The subset of applications may be selected from a plurality of applications available an online marketplace for such applications. The code may cause the apparatus to rank the applications based on signals relevant to the relative desirability to the user of different applications, wherein at least one of the signals is based on information that is generated outside of the marketplace. The code may cause the apparatus to select the subset of applications based on their respective rankings. The code may cause the apparatus to present the selected subset to the user.

Implementations can include one or more of the following features. For example, the subset of applications can include applications that are installable for use in a web browser. At least one of the signals based on information that is generated outside the marketplace can include a signal that is based on information received from one or more browsers that previously executed the application. At least one of the signals based on information that is generated outside the marketplace can include a signal that is based on at least one application performance metric. At least one of the signals based on at least one application performance metric can include a signal that is based on a rate at which the application crashes while being executed by a computing device. The signal based on the rate at which the application crashes while executing can be determined based on information about that crash rate that is received from browsers that execute the application. At least one of the signals based on at least one application performance metric can include a signal that is based on a response time of the application while being executed by a computing device.

At least one of the signals based on information that is generated outside the marketplace can include a signal that is based on how often an application is used after it is downloaded from the marketplace. Information can be received from a plurality of client devices about how often the application is front-facing within a user interface of the client device for executing the application, and the signal that is based on how often an application is used after it is downloaded from the marketplace can be based the received information. Information can be received from a plurality of client devices about how often the application is launched within a user interface of the client device for executing the application, and the signal that is based on how often an application is used after it is downloaded from the marketplace can be generated based on the received information. Information can be received from a plurality of client devices about how often the application is open within a user interface of the client device for executing the application, the signal that is based on how often an application is used after it is downloaded from the marketplace can be generated based on the received information.

At least one of the signals based on information that is generated outside the marketplace can include a signal that is based on recent trends in query terms, related searches, and results received through a search engine. At least one of the signals based on information that is generated outside the marketplace can include a signal that is based on how often an application is recommended by a user of the application to acquaintances in social networks of the user. The ranking of the applications can be specific to a user, and at least one of the signals based on information that is generated outside the marketplace can include a signal that is based on how often an application is used by acquaintances in social networks of the user.

The ranking of the applications can be specific to a user, and at least one of the signals based on information that is generated outside the marketplace can include a signal that is based on how often an application is used by acquaintances in social networks of the user.

The ranking of the applications can be specific to a user, and the method can further include associating metadata with applications of the plurality of applications, comparing the metadata associated with applications with information associated with the user, and ranking the applications based on the comparisons. The information associated with the user can include information generated by the user. The information generated by the user can include information actively provided by a user and information inferred from user actions. The information associated with the user can include a browsing history of the user. The information associated with the user can include a location of the user.

The details of one or more implementations are set forth in the accompanying drawings and the description below. Other features will be apparent from the description and drawings, and from the claims.

DETAILED DESCRIPTION

Figure 1:
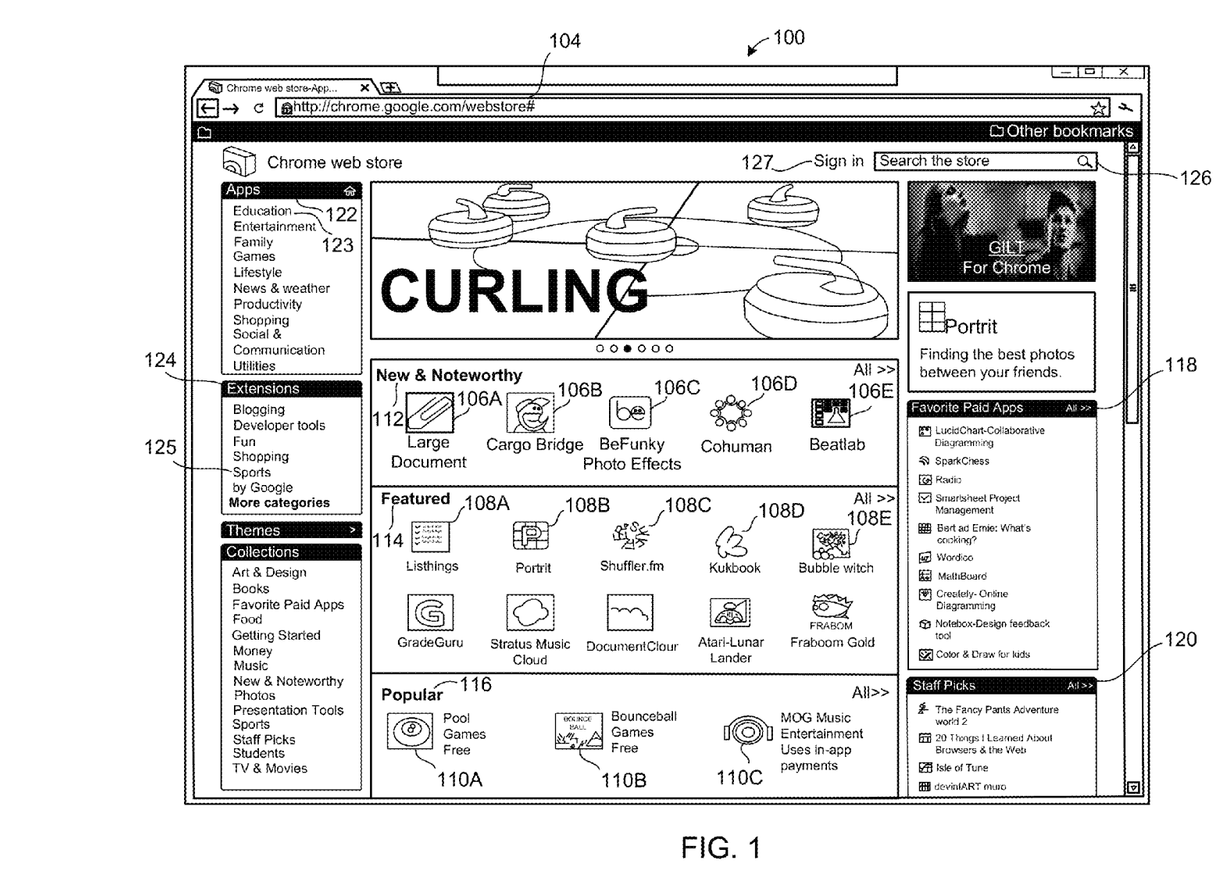
FIG. 1 is a screenshot of the user interface to a marketplace of digital goods.

FIG. 1 is a screenshot of a user interface 100 to a marketplace of digital goods. The user interface 100 can be displayed by a browser application that is executed by a computing device that may be connected to a network (e.g., the Internet). The browser application can open one or more tabs 102, one of which may display the user interface to the marketplace when a user navigates to a webpage identified by a uniform resource locator (URL) that provides content to the browser so that the browser can display the user interface to the marketplace in the tab.

The content provided by the webpage to the user can include a plurality of icons 106A, 106B, 106C, 106D, 106E, 106F, 108A, 108B, 108C, 108D, 108E, 110A, 110B, 110C that represent digital goods that can be downloaded from the webpage by the user for execution by a computing device controlled by the user. In one implementation, the digital goods can include applications that can be downloaded from the marketplace to a client computing device where they can be installed on the computing device for execution by a browser running on the computing device. Such applications can be known as "installable web applications," because they are downloadable from the World Wide Web and may be able to access the World Wide Web when executing in the browser. Thus, the installable web applications may not run natively on the computing device after they have been downloaded, but rather they may be executed through a browser that runs on the computing device.

Within the user interface 100, the installable web applications can be displayed in a manner that is organized to help a user decide which applications may be useful or relevant to the user. For example, the user interface 100 can include a category 112 of applications 106A, 106B, 106C, 106D, 106E, 106F that have been recently released in the marketplace and which a curator of the marketplace may deem to be especially noteworthy to users. In one implementation, the applications 106A, 106B, 106C, 106D, 106E, 106F shown in the category 112 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications 106A, 106B, 106C, 106D, 106E, 106F can be displayed within the category 112. That is, the applications 106A, 106B, 106C, 106D, 106E, 106F shown in the New and Noteworthy category 112 of the user interface 100 can be a subset of a larger number of applications that also could qualify as being new and noteworthy but which have not been selected for display in the user interface 100. A variety of signals that can be used to rank and select the subset of applications as described in more detail below.

In another example, the user interface 100 can include a category 114 of applications 108A, 108B, 108C, 108D, 108E that have been selected to be featured for display in the user interface 100. The applications 108A, 108B, 108C, 108D, 108E that are selected to be featured in the category 114 can be selected based on criteria evaluated by a curator of the market place. For example, the curator may select the applications 108A, 108B, 108C, 108D, 108E for display in the category 114 from a much larger set of applications based on the curator's opinion of the quality, popularity, or utility of the selected applications. In another implementation, the curator may select the applications 108A, 108B, 108C, 108D, 108E based upon payments made by developers of the applications in return for prominent display of the applications in the user interface 100.

In another example, the user interface 100 can include a category 116 of applications 110A, 110B, 110C that have been selected for display in the category 116 of the user interface 100 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications 110A, 110B, 110C with the highest rankings can be selected for display in the user interface 100 of the marketplace.

The user interface 100 of the marketplace also can include categories of applications in other subportions of the user interface 100 in which smaller icons are used to represent the applications that are used in categories 112, 114, 116. For example, category 118 can display "Favorite Paid Apps," which can be applications for which a user must pay money before being able to download and install the application on the user's computing device. Applications listed in the Favorite Paid Apps category 118 can be the most frequently downloaded and/or most frequently installed applications for which the user must pay money. In another example, category 120 can display "Staff Picks," which can be applications that are selected by a curator at the marketplace based on the selected applications being deemed especially interesting to users who visit the marketplace in search of applications.

Within the user interface 100, categories 112, 114, 116, 118, 120 can display a subset of applications that are categorized to fall within the category. Because screen space within the user interface is limited, only a subset of the applications that fall within a category may be displayed within the user interface 100. However, by selecting a hyperlink associated with the category, more applications that fall within the category can be displayed to a user. For example, each category 112, 114, 116, 118, 120 is associated with a hyperlink labeled "All," the selection of which may cause more applications that fall within the category to be displayed.

Other parts of the user interface 100 also can be used to organize the digital goods that are available in the marketplace. For example, an "Apps" section 122 can provide a list of hyperlinks, which each can be selected to display applications that belong to a category identified by the hyperlink. For example, selection of the "Education" hyperlink 123 can cause a group of icons that represent applications related to educational topics to be displayed. In another example, an "Extensions" section 124 can provide a list of hyperlinks, which each can be selected to display extensions that belong to a category identified by the hyperlink, where an extension is executable code that extends the functionality of a browser. For example, selection of the "Sports" hyperlink 125 can cause a group of icons that represent extensions related to sports topics to be displayed.

In addition to locating digital goods (e.g., Web applications and extensions) that are already displayed within a category 112, 114, 116, 118, 120 of the user interface 100 what it could be displayed as a result of selecting a hyperlink 113, 123, 125, digital goods also can be located as a result of a query for goods that may be of interest to the user. For example, a user may enter query terms into an query box 126 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 100.

The user interface 100 also includes a hyperlink 127 that can be selected so that the user can log into the marketplace. For example, selection of the hyperlink 127 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 100, where the selection of the goods can be personalized to the user based on data associated with the user's account.

Figure 2:
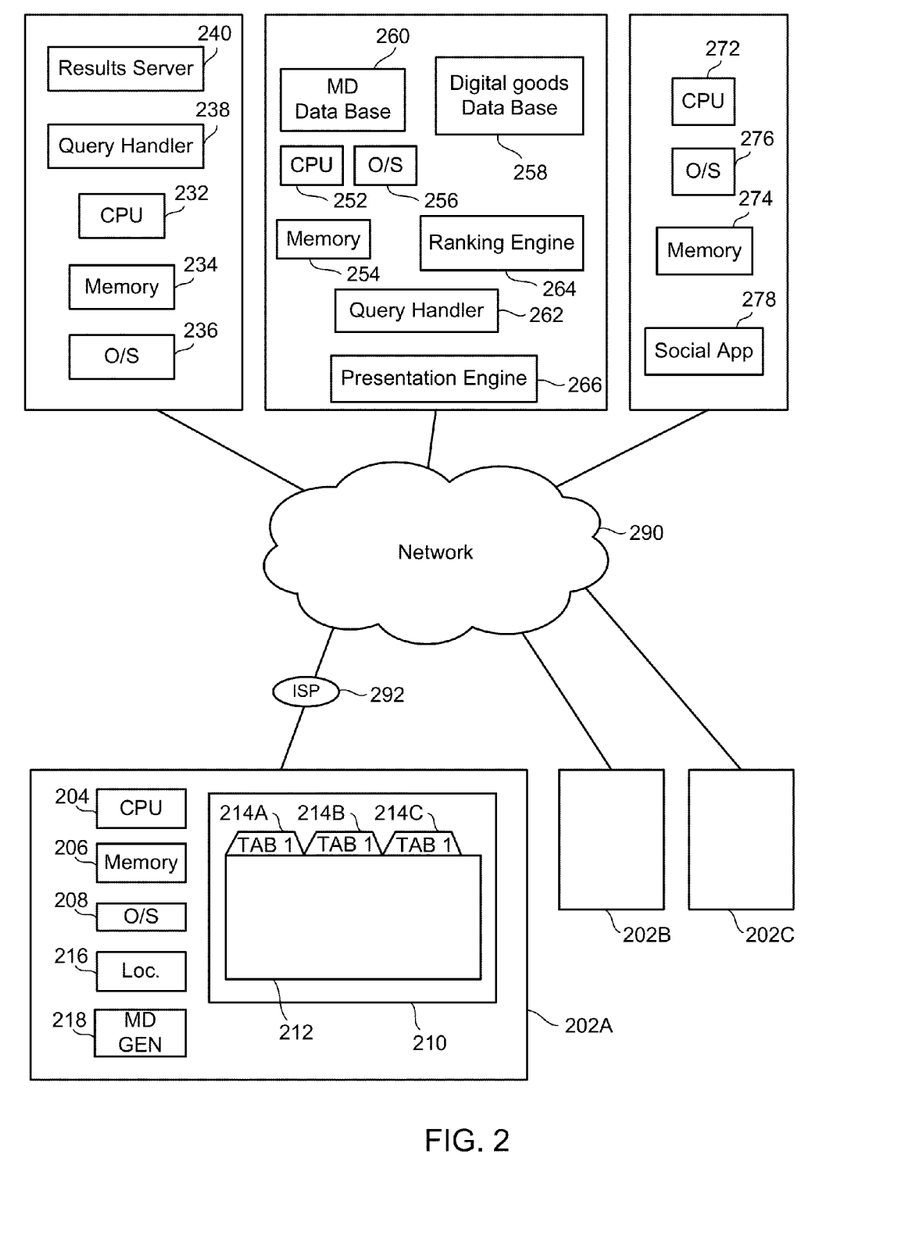
FIG. 2 is a schematic diagram of a system for ranking digital goods in a marketplace.

FIG. 2 is a schematic block diagram of an example embodiment of a system 200 for ranking digital goods in a marketplace. In various embodiments, the system 200 may include client computing devices (e.g., desktop computers, notebook computers, netbook computers, tablet computers, smartphone, etc.) 202A, 202B, 202C. A client computing device 202A can include one or more processors 204 and one or more memories 206. The client computing device 202A can execute an operating system 208 and an application 210 that which may display a user interface window 212. The client computing device 202A can include a location detector 218, which may automatically detect a location of the computing device, for example, based on global positioning system (GPS) signals, or by triangulation of signals from transmitters at known locations, or by using other hardware and/or techniques.

In one embodiment, the client computing device 202A may be running or causing the operating system 208 to execute an application 210 or window 212. For purposes of illustration the window 212 is referred to as a web browser. However, it is understood that the above is merely one illustrative example to which the disclosed subject matter is not limited. In various embodiments, this window 212 may include a plurality of panes or tabs 214A, 214B, 214C. The window 212 can be a visual area, usually rectangular, containing some kind of user interface. In a graphical user interface (GUI) used in the client device 202A, the window 212 can be a two-dimensional object arranged on a plane of the GUI known as the desktop. The window 212 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individuals tabs 214A, 214B, 214C. These tabs 214A, 214B, 214C are typically displayed one at a time, and are selectable via a tab-bar which often resides above the contents of an individual window. That is, one selected tab 214A is "forward-facing" and displays information or content to a user in the window 212, with the content of other tabs 214B, 214C is "hidden."

The client computing devices 202A, 202B, 202C may receive online content from one or more server computing devices 230, 250, 270, that may be connected to the client device 202 through a network 290. Each of the client computing devices 202A, 202B, 202C can be connected to the network 290 through a local Internet Service Provider 292. The received online content can be processed and displayed in the window 212 (e.g., in a on a tab 214 of the window 212). For example, the window 212 can display a user interface of a marketplace for digital goods, similar to the user interface of the marketplace described herein, to a user. A user can interact with the displayed content, and an activity metadata generator 218 can monitor the user's interactions with the content and the performance of the application 210 and can generate activity metadata based on the user's interactions with the content and based on the performance of the application 210.

A location of the client computing device 202A can be determined based on a location associated with the ISP 292. For example, a known location of the ISP can be used as an approximation or as a proxy for the location of the client computing device 202A.

The client computing device 202A can communicate with a digital goods marketplace server 250 that provides a marketplace for digital goods to client computing devices 202A, 202B, 202C. The marketplace server 250 can include one or more processors 252 and one or more memories 254. The marketplace server 250 can execute an operating system and various applications and services to provide functionality to the client computing devices. For example, in one implementation, the marketplace server 250 can include a repository for database of digital goods 258, and the digital goods can be served from, or downloaded from, the repository to the client computing devices. In another implementation, the digital goods can be stored in, and serve to client computing devices from, a repository that is remotely located from the marketplace server. For example, digital goods could be stored and served to client computing devices from individual repositories that are operated and controlled by developers of the digital goods, and digital goods repository 258 of the marketplace server 250 can provide just a reference to the individual repositories that are operated by the developers.

The marketplace server 250 can include a metadata database 260 that stores metadata associated with the digital goods that are available from or referenced by the digital goods repository 258. The metadata associated with a digital good can include a variety of information about the digital goods including, for example, information about the digital goods that are available from the repository 258. Such information can include, for example, representative keywords associated with the digital goods, the price associated with the digital goods. The metadata may also include demographic data about targeted users of the digital good, a time of year month or day during which the digital goods may be of the highest interest to a user, etc. For example, metadata associated with the surfing videogame may indicate that the good is intended for use by male users between the ages of 15 and 34, who live in coastal California or Hawaii, and that the game may be more popular during summer months than during winter months.

The marketplace server 250 can include query handler 262 that can be configured to receive and process queries for digital goods available in the marketplace. For example, the query handler can receive queries for digital goods that are entered into query box 126 of the user interface 100 shown in FIG. 1. Terms or phrases of the queries then can be compared to terms and phrases (e.g., terms and phrases stored in the metadata database 260) that are used to index the digital goods available in the marketplace. Based on the comparison, a subset of digital goods can be selected from the database 258 with which to respond to the query.

The marketplace server 250 can include a ranking engine 264 that is configured to rank digital goods based on signals relevant to the relative desirability of the goods to a user, where at least one of the signals is based on information that is generated outside the marketplace. For example, the goods can be ranked based on their price in the marketplace, but such a signal such as price is generated within the marketplace because the prices relevant only within the marketplace. However, as described herein, other signals can be generated outside the marketplace and used by the ranking engine to rank the relative desirability of goods to a user.

The marketplace 250 can include a presentation engine 266 that prepares information for transmission to the client computing devices 202A, 202B, 202C, where the information is used by the client computing devices to display a user interface 100 that shows representations of selected digital goods available in the marketplace. For example, based on the output of the ranking engine 264, the presentation engine 266 can prepare HTML code, XML code, etc. that determines the information that is displayed to a user in the user interface 100 and where the code determines which digital goods will be displayed in the user interface 100 to the user.

The ranking engine 264 can use a variety of signals to rank the relative desirability to the user of different digital applications available in the marketplace, where some of the signals can be based on information that is generated outside of the marketplace. In one implementation, the signals used by the ranking engine 264 can be based on how a web application available from the marketplace is used by a client computing device or how a web application performs when utilized by a client computing device.

In one implementation, a signal used by the ranking engine can be based on how often a digital good available from the marketplace is used on a client computing device 202A, 202B, 202C, after the digital good is downloaded from the digital goods repository 258 to the client computing device for execution on the client. For example, when a web application is downloaded from the repository 258 and is executed by a browser application 210 running on the client device 202A, the browser application can monitor each time the web application is launched within the browser and can report this information to the ranking engine 264. The ranking engine 264 then can rank the applications based on how often they are launched by client devices after they are downloaded. For example, an application that is launched frequently can be ranked higher than an application is launched less frequently.

The browser application 210 also can monitor and gather information about how often a user interacts with a web application after the web application has been downloaded from the digital goods database 258 and launched within a browser application 210 of the client computing device 202A. For example, the browser application 210 can provide a window 212 that can include multiple tabs 214A, 214B, 214C where one tab can be front-facing while other tabs are hidden. The browser application 210 can monitor how often a web application that is launched in the browser is front-facing, as opposed to hidden, and this information can be provided to the ranking engine 264 to provide an indication of how often a user interacts with the web application. The ranking engine 264 then can rank with applications based on how frequently a user interacts with the applications after they are downloaded. For example, an application with which a user interacts frequently can be ranked higher than an application with which a user interacts less frequently.

In another implementation, a signal used by the ranking engine can be based on at least one application performance metric. Examples of such application performance metrics may include: a rate at which a web application available from the marketplace crashes while being executed by a client computing device 202A, 202B, 202C, a response time of a web application while being executed by a client computing device 202A, 202B, 202C, or a system resource (e.g., processor usage, network bandwidth usage, etc.) usage or consumption a web application while being executed by a client computing device 202A, 202B, 202C, etc. It is understood that the above are merely a few illustrative examples to which the disclosed subject matter is not limited.

For example, in one other implementation, a signal used by the ranking engine can be based on a rate at which a web application available from the marketplace crashes while being executed by a client computing device 202A, 202B, 202C. In one implementation, after downloading a digital good from the marketplace server 252 to the client computing device 202A, the digital good can be executed by an application 210, and the application can provide feedback to the marketplace server 250 about the performance of the digital good. For example, a web application can be downloaded from the digital goods database 258 and installed on the client computing device 202A for execution by a browser application 210. Then, the browser application can monitor the performance of the web application, and the frequency with which the web application crashes.

The information that is provided by an application 210 running on a client device to the marketplace server 250 (e.g., regarding how a web application is launched, how often the user interacts with a web application, how often a web application crashes, etc.) can be provided on an opt-in basis. In other words, such information may be provided from the client computing device 202A to the server 250 only if the user of the client device specifically authorizes the transmission of such information from the client to the server.

Because the browser application 210 can communicate easily over the network 290, the browser application can provide feedback to the ranking engine 264 of the marketplace server about the local usage of the web application on the client computing device. By receiving such feedback from many client computing devices 202A, 202B, 202C, the ranking engine 264 can gather a great deal of information about how an application is actually used after it is downloaded from the marketplace server 250. Thus, the ranking engine 264 has the ability to rank digital goods available from the marketplace server 250 based on signals relevant to the relative desirability of different applications to users, where such signals can include signals based on information about how applications are actually used, or how applications actually perform, after the applications are downloaded from the marketplace server 250 and installed on a client computing device. Moreover, by using signals that are automatically generated as the web applications are used, the ranking of the digital goods in the marketplace can be somewhat more objective than rankings based on subjective user reviews based on users' experience with the web application, which users may enter directly into the marketplace server 250 (e.g., by adding metadata information about a digital goods to the metadata database 260).

The above-described signals are but a few examples of signals based on information that is generated outside of the marketplace and that is relevant to the relative desirability to the user of different applications that are available from the marketplace. Other signals also can be used by the ranking engine 264.

In another implementation, signals based on information that is generated outside of the marketplace and that are used by the ranking engine 264 for ranking the relative desirability of digital goods available marketplace can include signals based on information provided by a search engine. For example, in one implementation, such signals can be based on recent trends in query terms received through a search engine.

As shown in FIG. 2, the system 200 can include a search engine server 230 that includes one or more processors 232, one or more memories 234, an operating system 236, a query handler 238, and a result server 240. The query handler 238 can receive queries that include one or more query terms or query phrases from client computing devices 202A, 202B, 202C, and a result server 240 can provide search results in response to the queries. The search engine server 230 can monitor the query terms and phrases received from client devices, and based on the query term traffic the search engine server 230 can generate statistics about trends in users' interests. For example, when a previously-unknown singer becomes a star entertainer, trends in query term traffic may reveal that users are becoming more interested in discovering information about the singer. Similarly, when a movie or a game becomes popular, trends in the search engine traffic received to the search engine server 230 can automatically reveal the increase in the popularity. In another example, search engine trends can be driven by seasonal factors, such as search queries for "costumes" rising in the weeks before Halloween, or queries for the purchase of products rising during the winter holiday season.

Such trends in query term traffic can be provided by the search engine server to the marketplace server 250, so that the ranking engine 264 of the marketplace server can rank digital goods available in the marketplace based on trends in query traffic. For example, the ranking engine 264 can boost or lower the relative ranking of individual digital goods available in the marketplace will 250 based on search engine traffic. Thus, for example, when search engine traffic reveals that a game or a movie is becoming popular, and such information is provided to the ranking engine 264, the ranking engine can boost the ranking of web applications that are related to the game or the movie.

In another implementation, signals based on information that is generated outside of the marketplace and that are used by the ranking engine 264 for ranking the relative desirability of digital goods available marketplace can include signals based on information provided by a social network applications or servers. For example, in one implementation, such signals can be based on how digital goods are used by acquaintances of a particular user, and the rankings performed by the ranking engine 264 can be based on such signals and can be specifically tailored for the particular user.

As shown in FIG. 2, the system 200 can include a social network server 270 that includes one or more processors to 272, one or more memories 274, an operating system 276, and a social network application 278. The social network application 272 can provide a network, environment, virtual world through which a particular user can interact with selected colleagues, friends, acquaintances (collectively, "friends") of the particular user. For example, the particular user can exchange information with his or her friends about interests that they may share. Thus, a user that downloads a digital good from the marketplace server 250 and installs and executes the digital goods within a client computing device controlled by the user may recommend the web application to the user's friends. Such recommendations pass through the social application 278, and anonymous information about such recommendations can be gathered by the social network server 270 and then passed on to the ranking engine 264. The ranking engine then can base its rankings of digital goods in the marketplace on statistical information about such recommendations. For example, the ranking engine 264 can boost the ranking of a web application that has received a large number of recommendations within the context of a social network application 278. In another example, the ranking engine 264 can boost a user-specific ranking of a web application when the web application has been recommended frequently within the context of a social network application by friends of the specific user to their friends.

The ranking engine 264 also can use other signals that are generated outside of the marketplace to generate rankings of digital goods available in the marketplace. In one implementation, the ranking engine 264 can provide rankings specific to a user of digital goods that are available within the marketplace, where the rankings are based in some way on information that is associated with the user and that is generated outside the marketplace. In one implementation, the information associated with the user may include information that the user actively provides or enters (e.g., the user's age, one or more user entered preferences, likes or dislikes, etc.). In one implementation the information associated with a user may include information inferred from user actions (e.g., the user's browsing history, the user clicking on advertisements, etc.) or passively gathered about the user (e.g., the user's location, etc.).

For example, a location associated with the user can be compared to metadata associated with digital goods, and the ranking engine 264 can provide rankings of digital goods based on such comparisons. A location of a user can be determined in a number of ways, including by the location generator 216 or based on a location associated with the ISP 292 through which the user's client device communicates with a network 290. The location of a user can be compared to metadata associated with digital goods so that the relevance of digital goods to the user can be ranked based on the user's location. For example, an application that calculates marine tides generally be of low relevance to a particular user who lives far from the coast, and accordingly should be ranked low for the titular user by the ranking engine. Thus, when information about the user reveals that the user lives or is located in Albuquerque N. Mex., then a marine tide web application that is associated with metadata indicating that the application is relevant to coastal users, would have a relatively low ranking for the user.

In another implementation, information associated with the user can include a browsing history of the user that provides information about content (e.g., websites) that the user has accessed through a browser application 210. Metadata about the accessed content, or the content itself, can be compared to metadata associated with digital goods available in the marketplace. Based on the comparison, the ranking engine 264 can provide rankings of the available digital goods to a user that are individually-tailored to the interests of the user, as determined from the browsing history of the user. For example, if the browsing history reveals that the particular user is primarily interested in playing computer or video games, then the ranking engine can boost the user-specific rankings of game applications that are available in the marketplace.

The information that is provided by an application 210 running on a client device to the marketplace server 250 (e.g., regarding a user's browsing history, etc.) can be provided on an opt-in basis. In other words, such information may be provided from the client computing device 202A to the server 250 only if the user of the client device specifically authorizes the transmission of such information from the client to the server.

Figure 3:
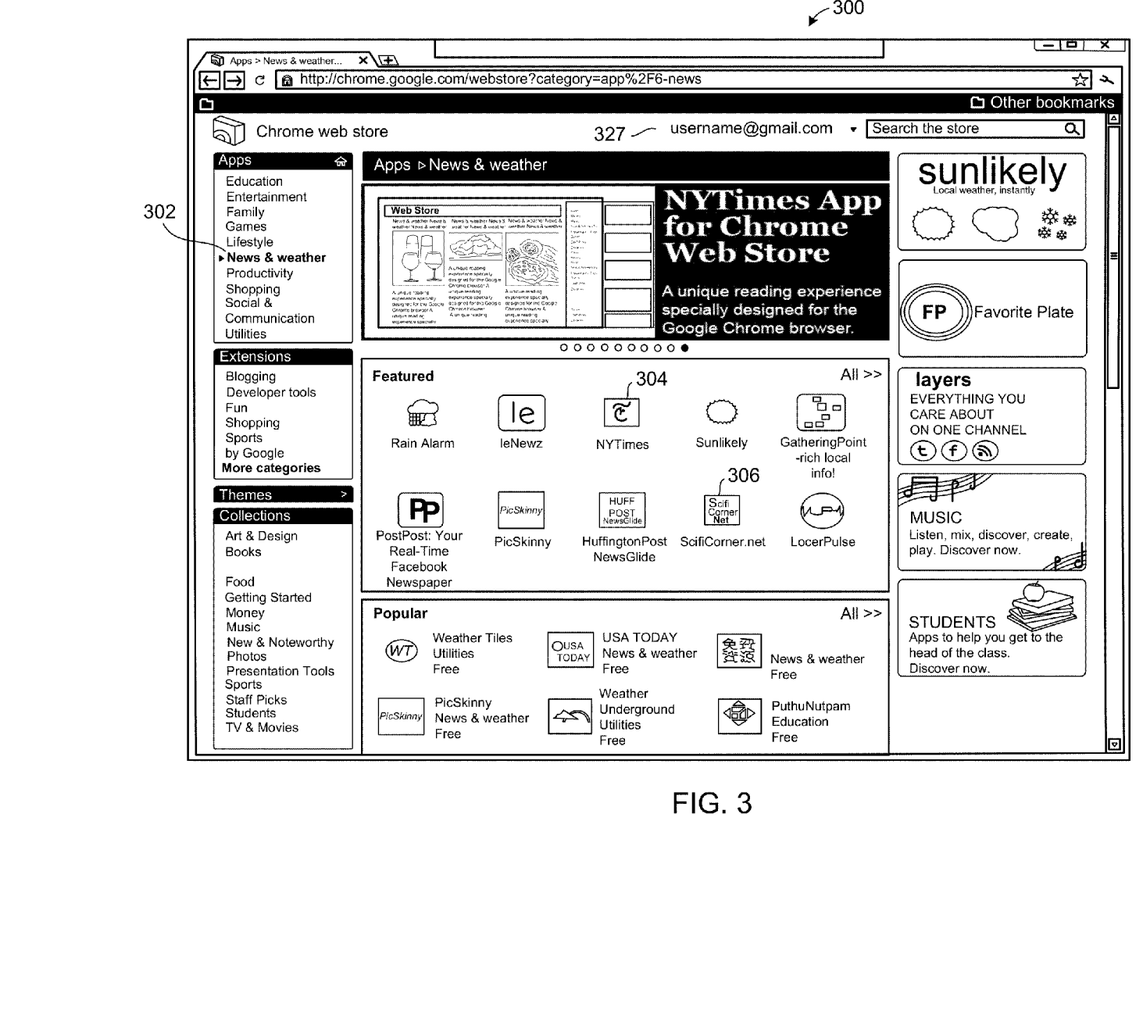
FIG. 3 is another screenshot of a user interface to a marketplace of digital goods.

FIG. 3 is a screenshot of the user interface 300 to a marketplace of digital goods. The presence of a username 327 in place of the hyperlink 127 that is selectable so that the user can enter login credentials indicate that a user has logged in to an account associated with the marketplace that is presented by the marketplace server 250. The account associated with the marketplace also can be associated with other online or local services or applications the user may use. For example, the account associated with the marketplace also can be associated with the user's online e-mail account (e.g., Microsoft Hotmail, Yahoo mail, Google Gmail, etc.) the user's online social network account (e.g. Facebook, twitter, etc.), the user's online photo account (e.g., Snapfish, Shutterfly, Picasa, etc.), accounts at content websites (e.g., news websites game websites, entertainment websites, etc.), etc. By associating the user's marketplace account with other accounts of the user, information from the other accounts can be utilized, with the permission of the user, by the ranking engine 264 to provide user-specific rankings of digital goods available in the marketplace to the user. For example, selection of the "news and weather" hyperlink 302 can trigger the display of featured in popular web applications related to news and weather within the user interface 300.

The applications that have been selected for display in the user interface 300, and the position and order in which the selected applications are presented in the user interface, can be based on rankings of the applications provided by the ranking engine 264. For example, if the user has registered and opened an account with the website of the New York Times and that account is associated with the user's marketplace account 327, then the ranking engine 264 may boost the ranking of a web application 304 that is associated with the New York Times. If that user has not registered and opened an account with the Wall Street Journal, or if a user account with the Wall Street Journal is not associated with the user's marketplace account, then the ranking engine may boost the ranking of a web application associated with the New York Times 304 above the ranking of a web application associated with the Wall Street Journal for that particular user. Then, the web application associated with the New York Times 304 may be selected for display in the user interface 300 over a web application associated with the Wall Street Journal.

In another implementation, the ranking engine 264 may select an application 306 that provides news about science fiction related topics for display in the user interface 300 based on signals that are generated outside of the marketplace. For example, if the user's social network friends have downloaded and installed a web application related to science fiction news 306, the ranking engine 264 may boost the ranking of the web application 306. In another example, if the user's browsing history indicates that the user is interested in science fiction related information, the ranking engine 264 may boost the ranking of the web application 306.

Figure 4:
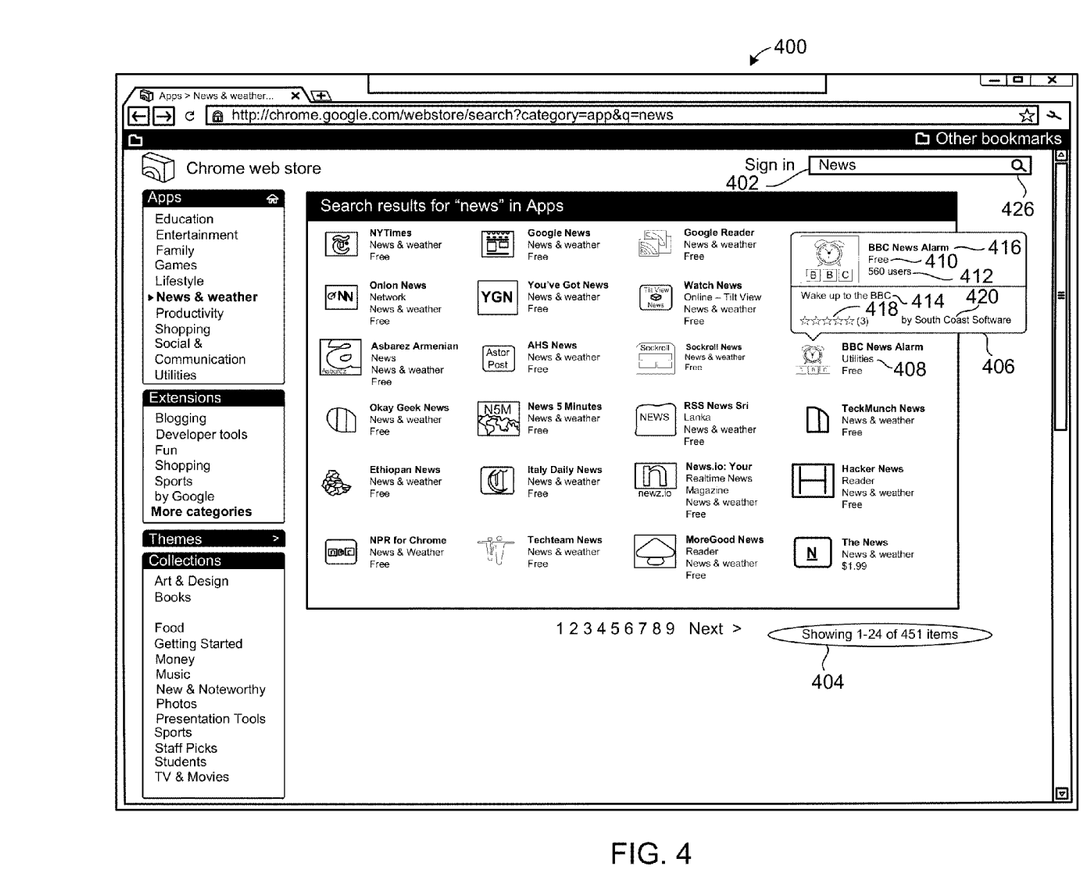
FIG. 4 is another screenshot of a user interface to a marketplace of digital goods.

FIG. 4 is a screenshot of the user interface 400 to a marketplace of digital goods. The screenshot is representative of a user interface that can be displayed when a user enters a query term "news" in query box 426 to search for web applications available in the marketplace that are related to news. The query term can be compared to metadata associated with digital goods, for example, metadata stored in metadata database 260. Based on the comparison, the query handler 262 can identify one or more digital goods that are related to the query term. The user interface 400 includes a display item 404 that indicates that a total of 451 web applications have been identified in the marketplace as relevant to the query term "news" and that 24 of the identified applications have been selected for display in the interface 400. The applications that are selected for display in the user interface can be selected based on a ranking of the relative desirability of the identified applications. Furthermore, among the selected subset of applications, the position of the applications within the user interface 400 can be determined by their ranking For example, applications with higher rankings can be displayed in rows at the top of the user interface 400, and, within a row, applications with a higher ranking can be displayed on the left side of the row.

A pop-up HTML window 406 can be displayed when a user moves a mouse icon over an icon for an application 408 that is displayed in the user interface 400. Within the pop-up HTML window 406, additional information about the web application 408 can be displayed. For example a field 410 can indicate whether the application is free or the price that must be paid to be able to download and install the app. Another field 412 can indicate how many users have downloaded and/or installed and/or used the application. Information about the installation and/or use of the application on a client device can be transmitted from a browser executing the application of the client device to the marketplace server 250. Another field 414 can display descriptive information about the web application that supplements information in the title field 416. Another field 418 can display an average subjective rating that users have provided of the web application and a number of users that have rated the application. Another field 420 can display the name of the author or developer of the application.

The rankings can be determined based on a number of factors or signals, which may include signals that are generated within the marketplace and outside of the marketplace. For example, signals generated within the marketplace can include a relevance of a web application to the query term(s) 402 that are entered in the query box 426 (e.g., as determined by the query handler 262), user feedback of the web applications entered into the marketplace (e.g., by the user's providing comments on the web application or by ranking the application based on a 1-5 star system), or by the number of times an application has been downloaded from the marketplace.

For example, signals generated outside of the marketplace can include the number of times a web application has been launched by an application (e.g., a browser application) running on a client to which the application has been downloaded, the number of times a web application is crashed after it has been downloaded to a client device, how often an application is used after it is downloaded to a client device, how often an application is front facing after being launched by an application running on a client device to which the application has been downloaded, etc. In the example shown in FIG. 4, the NYTimes web application may be the highest ranked application of the 451 items that are responsive to the "news" query entered in the query box 426 and therefore can be displayed in the user interface in the top left corner of the interface. Other applications that are less highly ranked in the NYTimes application may be displayed elsewhere in the user interface or may not be displayed in the first group of 24 applications that are displayed in the interface shown in FIG. 4.

Figure 5:
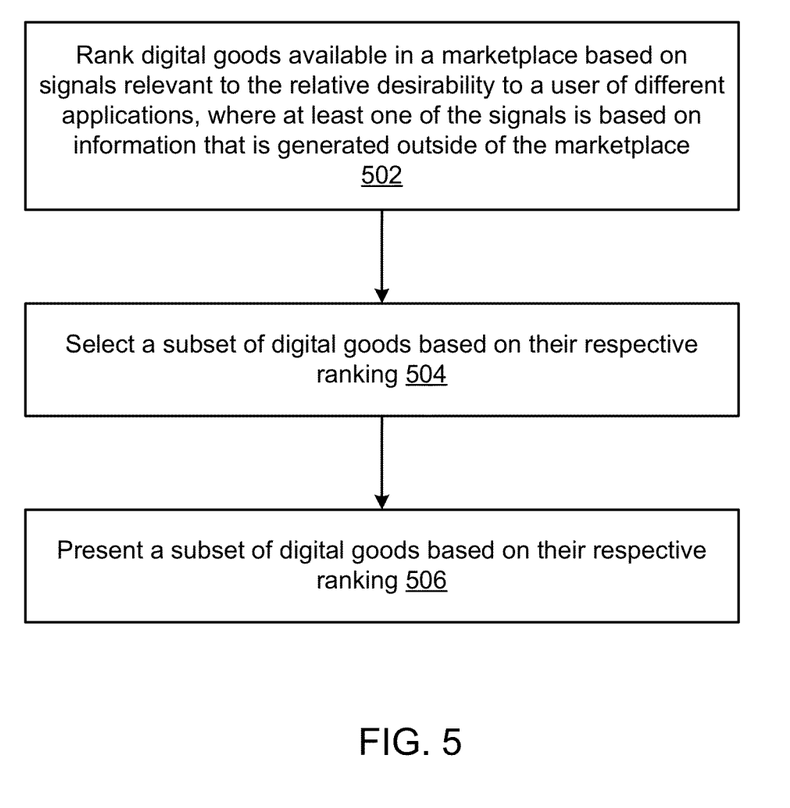
FIG. 5 is a flowchart of a process for making digital goods in a marketplace.

FIG. 5 is a flowchart of a process for presenting to a user a subset of digital goods that may be executed by a computing device, where the subset of digital goods is selected from a plurality of goods available in online marketplace for such goods. The flowchart shown in FIG. 5 can be performed at least in part by a marketplace server (e.g., the server 200 shown in FIG. 2). As shown in FIG. 5, the digital goods can be ranked (e.g., by the ranking engine 264) based on signals relevant to the relative desirability to the user of different applications, where at least one of the signals is based on information that is generated outside of the marketplace (502). The subset of digital goods is selected based on their respective rankings (504). For example, the ranking engine 264 can select the subset of digital goods from the digital goods database 258 in the marketplace server 250. The selected subset of digital goods is presented to the user (506). For example, the presentation manager 266 can present the selected subset of digital goods to a client device, so that the client device can process the presented digital goods and display them within a display window 212 on a client device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. In some implementations, a computer-readable storage medium can store instructions that when executed can cause a processor (e.g., a processor of a mobile device, a processor of a host device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Process steps may be performed by one or more programmable processors executing a computer program to perform functions by operating on input data and generating output. Process steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method of presenting to a user a subset of applications that are installable for use in a web browser executed by a computing device, the subset of applications being selected from a plurality of applications available in an online marketplace for such applications, the method comprising:
  ranking the applications based on signals relevant to the relative desirability to the user of different applications, wherein at least one of the signals is based on information that is generated outside of the marketplace, wherein at least one of the signals is based on information about how applications available from the marketplace are used by client computing devices or about how the applications perform when utilized by a client computing device, wherein such information is generated automatically when the applications are executed by a web browser running on a client computing device;
  selecting the subset of applications based on their respective rankings; and
  presenting the selected subset to the user.

2. The method of claim 1, wherein at least one of the signals based on how the applications perform when utilized by a client computing device includes a signal that is based on a rate at which an application crashes while being executed by a computing device.

3. The method of claim 2, wherein the signal based on the rate at which the application crashes while executing is determined based on information about that crash rate that is received from browsers that execute the application.

4. The method of claim 1, wherein at least one of the signals based on how the applications perform when utilized by a client computing device includes a signal that is based on a response time of an application while being executed by a computing device.

5. The method of claim 1, wherein at least one of the signals based on information that is generated outside the marketplace includes a signal that is based on how often an application is used after it is downloaded from the marketplace.

6. The method of claim 5, further comprising:
  receiving information from a plurality of client devices about how often the application is front-facing within a user interface of the client device for executing the application; and
  generating the signal that is based on how often an application is used after it is downloaded from the marketplace based on the received information.

7. The method of claim 5, further comprising:
  receiving information from a plurality of client devices about how often the application is launched within a user interface of the client device for executing the application; and
  generating the signal that is based on how often an application is used after it is downloaded from the marketplace based on the received information.

8. The method of claim 5, further comprising:
  receiving information from a plurality of client devices about how often the application is open within a user interface of the client device for executing the application; and
  generating the signal that is based on how often an application is used after it is downloaded from the marketplace on the received information.

9. The method of claim 1, wherein at least one of the signals based on information that is generated outside the marketplace includes a signal that is based on recent trends in query terms, related searches, and results received through a search engine.

10. The method of claim 1, wherein at least one of the signals based on information that is generated outside the marketplace includes a signal that is based on how often an application is recommended by a user of the application to acquaintances in social networks of the user.

11. The method of claim 1, wherein the ranking of the applications is specific to a user, and wherein at least one of the signals based on information that is generated outside the marketplace includes a signal that is based on how often an application is used by acquaintances in social networks of the user.

12. The method of claim 1, wherein the ranking of the applications is specific to a user, and wherein at least one of the signals based on information that is generated outside the marketplace includes a signal that is based on how often an application is used by acquaintances in social networks of the user.

13. The method of claim 1, wherein the ranking of the applications is specific to a user, and wherein the method further comprises:
  associating metadata with applications of the plurality of applications;
  comparing the metadata associated with applications with information associated with the user; and
  ranking the applications based on the comparisons.

14. The method of claim 13, wherein the information associated with the user includes information generated by the user.

15. The method of claim 14, wherein the information generated by the user includes:
  information actively provided by a user, and
  information inferred from user actions.

16. The method of claim 13, wherein the information associated with the user includes a browsing history of the user.

17. The method of claim 13, wherein the information associated with the user includes a location of the user.

18. A non-transitory, tangible computer-readable storage medium having recorded and stored thereon instructions that, when executed by one or more processors of a computer system cause the computer system to:
  rank applications in a plurality of applications available in an online marketplace for applications that may be executed by a computing device based on signals relevant to the relative desirability to the user of different applications, wherein at least one of the signals is based on information that is generated outside of the marketplace;
  select the subset of applications based on their respective rankings; and
  present the selected subset to the user.

19. A system comprising:
  one or more memory devices arranged and configured to store executable code; and
  one or more processors operably coupled to the one or more memory devices, the processors being arranged and configured to execute the code such that the apparatus performs the actions of:
  ranking applications in a plurality of applications available in an online marketplace for applications that may be installed for use in a web browser executed by a computing device, wherein the ranking is based on signals relevant to the relative desirability to a user of different applications, wherein at least one of the signals is based on information that is generated outside of the marketplace, wherein at least one of the signals is based on information about how applications available from the marketplace are used by client computing devices or about how the applications perform when utilized by a client computing device, wherein such information is generated automatically when the applications are executed by a web browser running on a client computing device;

selecting the subset of applications based on their respective rankings; and presenting the selected subset to the user.

\* \* \* \* \*